April 2, 1957 G. H. SCHURGER 2,787,175
ROTARY MACHINE TOOL TABLE
Filed Feb. 16, 1955 2 Sheets-Sheet 1

Inventor
Garner H. Schurger
Carlson, Pitzner, Hubbard, & Wolfe
Atty's

April 2, 1957     G. H. SCHURGER     2,787,175
ROTARY MACHINE TOOL TABLE

Filed Feb. 16, 1955     2 Sheets-Sheet 2

Inventor
Garner H. Schurger
Carlson, Pitzner, Hubbard, & Wolfe
Atty's 2,787,175
Patented Apr. 2, 1957

2,787,175
ROTARY MACHINE TOOL TABLE

Garner H. Schurger, Fond du Lac, Wis., assignor to Giddings & Lewis Machine Tool Company, Fond du Lac, Wis., a corporation of Wisconsin Application February 16, 1955, Serial No. 488,593

7 Claims. (Cl. 77—64)

This invention relates generally to rotary machine tool tables.

Machine tool work surfaces must often be made conveniently movable, both rotatable and liftable for rotation, and yet capable of being locked in a precisely predetermined position, a common example of which is the rotary table or platen for use with machine tools such as horizontal boring machines and the like. One type of indexing means sometimes employed is the plunger or pin and socket arrangement in which a slidable pin on the worktable base is engageable with a selected one of the sockets provided around a worktable at the desired intervals. In order to lock the table in a precisely predetermined position, however, extremely close tolerances have usually been required for the mating surfaces. Under such conditions which may require allowance for lifting of the table during its rotation, the indexing devices are often difficult to operate or subject to inaccuracy due to wear.

It is, therefore, an object of my invention to provide an improved plunger and socket alining or indexing means for relatively movable surfaces.

It is another object to provide a rotary worktable having an improved precision indexing means.

It is still another object to provide in a fluid lift table a convenient and precise positioning and locking means.

It is a further object of my invention to provide an indexing device for a rotary machine tool table which provides extremely precise positioning.

It is a still further object to provide such an indexing means which allows compensation for wear of the relatively movable parts.

It is also an object of my invention to provide for a liftable, rotary machine tool worktable a precision positioning means which is simple to construct as well as conveniently and easily operated.

Other objects and advantages of the invention will become apparent in the detailed description of the preferred embodiments disclosed in the accompanying drawings in which.

Figure 1:
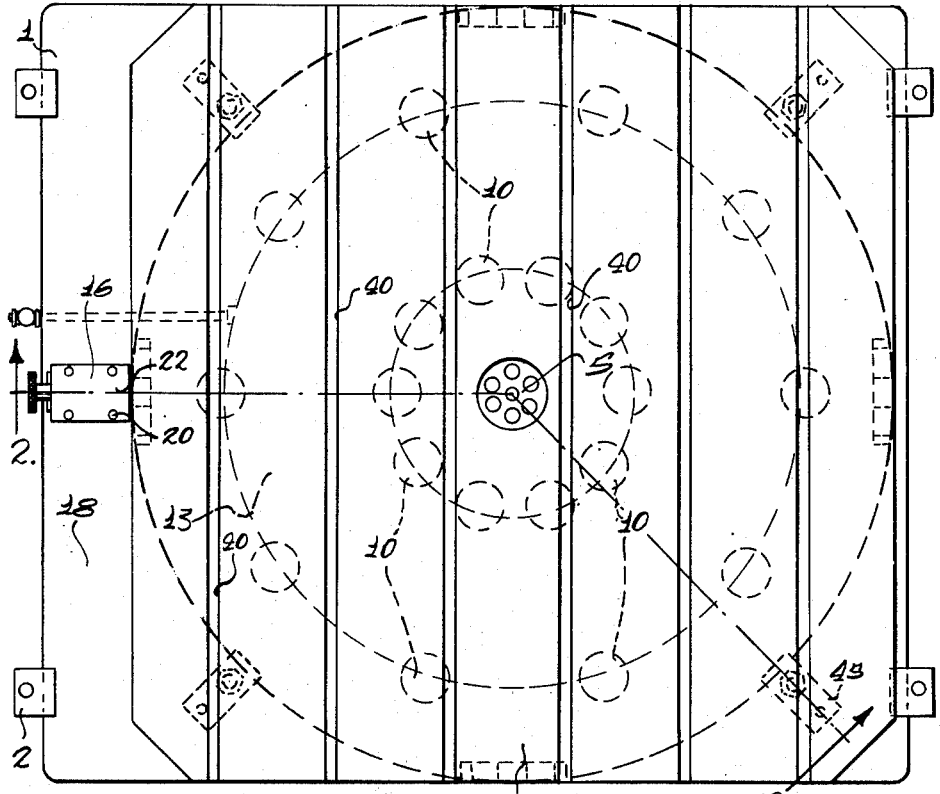
Figure 1 is a top view of a rotary index table incorporating my invention.

While the invention is suscecptible of various modifications and alternative constructions, I have shown in the drawings and will here describe in detail the preferred embodiments, but it is to be understood that I do not thereby intend to limit the invention to the specific form disclosed, but intend to cover all modifications, alternative constructions and equivalents falling within the spirit and scope of the invention as expressed in the appended claims.

Figure 2:
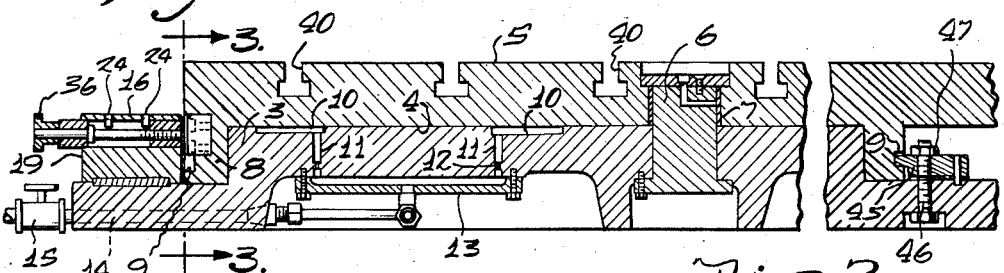
Fig. 2 is an enlarged cross-sectional view along lines 2—2 of Fig. 1, but with the plunger withdrawn.

Referring now to Figs. 1 and 2, a rotary worktable assembly in which my invention may be advantageously incorporated is illustrated therein. This assembly is designed in this case as an attachment for a horizontal boring machine to be fastened to the table of such machine so that a workpiece clamped to the rotary table may be indexed to present four vertical sides of the work to the boring machine tool spindle without resetting the work on the table. The assembly comprises a base 1, suitably of rectangular shape and made of heavy steel plate adapted to be clamped to a surface, such as the boring table or platen mentioned, by clamps 2. A raised circular base portion 3 has a flat upper surface which supports the complementary lower surface 4 of the rotary worktable 5. The table 5 is rotatable around its central axis on a stub spindle assembly 6 extending upwardly from the lower surface of the table. A bushing or sleeve is seated in a center bore 7 in the table as a bearing surface, and an enlarged diameter upper end portion of the spindle assembly 6 sliding in the center bore keeps chips and coolant away from the bearing surfaces, and restricts separation of the table from the base.

A downwardly extending circular rim or annulus 8 on the lower surface of the worktable surrounds the circular raised portion 3 of the base and guards the bearing surfaces against entry of liquid coolant and chips. Clearances (not shown) between the inner and lower surfaces of the rim 8 and the facing surfaces of the base may be large and are not critical in view of the raised support surface of the circular base portion 3. The rim has a substantial thickness to provide a solid housing for positioning means engageable with stations positioned near the outer diameter of the rim. The rim is also undercut to define an outer circular clamping flange 9 at its lower end.

The table 5, that is, its upper or work surface, may have any desired shape, being suitably squared for a four position table, as its outline does not interfere with the rotation of the circular table rim 9 past the positioning stations. As shown, the table is also preferably provided with T-slots to facilitate the clamping of workpieces to it.

An air lift or other fluid lift means is preferably employed so that the table, when lifted, presents very little friction upon rotation to the several indexing positions despite the large mass of the table and the workpiece which may be supported thereon. The lifting required is limited to a few thousandths of an inch, the table sliding vertically on the spindle 6 to this extent. For this purpose, the machined finish surface of the circular raised portion 3 of the base is provided with a plurality of spaced depressions or recesses to define the air lift pads 10, each suitably being circular in shape as shown in the drawings. Two concentric circular arrays of such pads 10 are provided. The pad or depression depth is appreciable so that the fluid pressure equalizes over the pad face, but the remainder of the upper surfaces of the base portion 3 is smooth without channels or grooves. The lower surface 4 of the table 5 is likewise a smooth plane with a high finish.

Figures 8, 9:
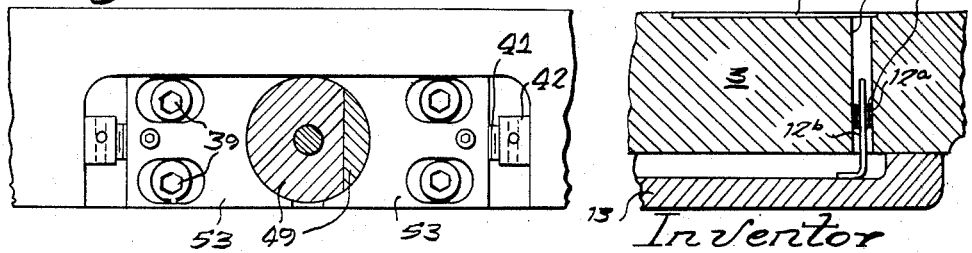
Fig. 8 is a sectional view along lines 8—8 of Fig. 7.
Fig. 9 is an enlarged view of a fluid lift restricted aperture useful in the table of Figs. 1 and 2.

A plurality of vertical passageways 11, one from each of the pads, are provided through the base portion 3, and each passageway or orifice has a portion 12 of restricted cross section area (see Fig. 9). A large annular manifold housing 13 is sealingly fastened to the lower surface of the base to define a chamber into which the passages 11 open. This chamber is connected by a pipe 14 to a source of air under pressure. A three-way control valve 15 is suitably manually operated to supply air under pressure to the manifold and also to vent the back pressure from the manifold.

When the valve is open and the air is under sufficient pressure, a lifting force is exerted on the rotary workable on its lower surface 4 above each of the depressions 10 in the inner and outer circular arrays on the base portion 3. This results in a very small elevation of the rotary table, at most a few thousandths of an inch, but is sufficient to in effect float it and allow it to be readily turned with respect to the center spindle. The system does not depend upon sealing the air since the small escape flow does not normally drop the supply pressure, except for some pressure drop across the constrictions or orifices. The constrictions in the vertical passageways 11 help to prevent tilting when the center of gravity of the load represented by the workpiece is off center with respect to the table spindle by restricting the air flow through the passages. Thus even though air might be escaping from one pad and between the opposing surfaces to atmosphere beyond the rim 8, the manifold pressure is maintained due to the large pressure drop through the restricted orifice to the "open" pad. Air under sufficient pressure from the manifold is thus supplied to the other pads through their restricted orifices. The load on the table is thus lifted despite its unbalanced or off-center position with respect to the circular pad arrays around the table center spindle. The table lift in this manner compensates for the very slight tilting tending to cause a more free escape of air from the pads under its unloaded side. The entire table thus normally floats during lifting on an air cushion a few thousandths of an inch thick, the leakage of the air under the table rim and the available pressure limiting the lift of the table. Under these conditions of small air flow, the pressure at the various pads is substantially equalized and the pressure drops across the orifices are small and substantially equal.

While the fluid used for the lift is preferably air, it is obvious, of course, that hydraulic fluids, including oils, may be employed. Air, however, as a gas, presents no problem of collecting and reclaiming since it may be simply and safely vented to atmosphere. Not only is a piping system for removing the fluid avoided, but the simple manifold supplies the high pressure air to the various pads from the usually conveniently available shop air line. After the table is indexed to the desired position, the three-way valve is actuated to close the air supply line and permit the entrapped air to escape quickly. If desired, the air may instead be allowed to escape more slowly from under the lower rim 8 of the table. In any event, the table after being lowered by the drop of the air pressure in the manifold and pads, rest solidly on the upper surface of the raised base portion 3 in metal to metal contact, except at the pad areas.

For establishing the pressure drop of the orifices 11 the constriction cross section area and length is readily controlled as indicated in Fig. 9. This view illustrates a practical arrangement not detailed in Fig. 2 for the sake of clarity of that drawing figure, and represents a preferred contruction.

As shown in Figure 9, each passageway 11 is conveniently provided by a relatively large vertical bore through the base portion. This bore, which may be of the order of one-fourth inch diameter, is effectively reduced in cross section by a separately fabricated press-fitted tubular insert or bushing 12a as the constricted orifice length portion 12. A rod or wire 12b is positioned within the bushing 12a and supported as by bending over its lower end and thus supporting it on the inner surface of the manifold below the bore 11. The annular space between the inner surface of the bushing 12a and the rod 12b defines the cross section area of the orifice. The rod length is conveniently greater than the bushing length, the length of the bushing thus conveniently determining the orifice length. While one skilled in the art will appreciate that the orifice dimensions are governed by the particular requirements of apparatus embodying my invention, an order of magnitude is indicated by the dimensions in the illustrated embodiment where the bushing is .375 inch long with an inner diameter of .086 inch and the rod diameter is .072 inch. It will be appreciated that the orifice can be conveniently changed without remachining the table. The orifice dimensional requirements are also met with a minimum of machining difficulty and clogging is avoided by reason of the annular construction.

Further in accordance with my invention a positive indexing means employing a plunger or bolt assembly 16 is incorporated on the base 1 of the rotary table and at least one socket assembly 17 is incorporated in the lower rim 8 of the table 5 so that the table may be precisely positioned as desired.

Referring now to the plunger assembly 16, a base portion extends beyond the table 5 overlying the remainder of the base to provide a plunger assembly station adjacent the table rim 8. The plunger housing suitably comprises a steel block 19 solidly fixed to the work base portion 18 by housing bolts 20. A channel or guideway defining side walls 21 on either side of it is provided in the plunger housing and is directed radially toward the spindle 6 or axis of rotation of the circular table 5. A cover plate 22 fastened to the sidewalls 21 of the housing by bolts 23 completes a rectangular slide for an indexing plunger. Plunger stops 24 in the form of pins projecting from the cover plate into the bore are also provided to limit the plunger displacement.

The plunger itself comprises an assembly of complementary generally wedge-shaped members 25 and 26. As may be readily seen by particular reference to Figs. 4 or 5, each wedge has a flat base 27 and an end surface 28 with a diagonal surface 29 between the base and end surface so that the wedge members can be assembled as a rectangular plunger having parallel side walls defined by the bases 27 of the wedges. While the minimum width of said plunger is determined by the width of either wedge end 28, the width can be adjustably increased above that minimum dimension by sliding the wedge members toward each other to decrease the distance between the wedge ends. A central portion 30 of each wedge diagonal surface is cut away to define a rectangular opening in the wedge assembly.

The relative sliding movement of the wedges which provides the plunger expansion between the housing side walls 21 is preferably limited to a small proportion of the over-all wedge length so that the bearing surfaces defined by the wedge bases 27 remain substantially opposite each other in expanded wedge position. The maximum allowable size of the central opening defined by the cut-away portions 30 is likewise dependent upon the extent of sliding movement desired. It is against the ends of this opening that the stop pins 24 bear to limit the slide of the plunger members 25 and 26.

A central bore through the wedge assembly, that is, through each wedge 25 and 26 along a common axis parallel to the wedge bases 27 receives a screw shaft 31 for controlling the plunger expansion. The bore 32 in the wedge member 25 provides a substantial clearance for the unthreaded portion of the shaft while the bore 33 in the other wedge member 26 is threaded to receive the threaded end 34 of the shaft. The shaft itself is provided with a collar or shoulder 35 which is adapted to engage the end of the wedge cut-out 30 on wedge member 25. A knurled knob or other handle 36 for turning the screw shaft is fixed to the free end of the shaft 31.

Upon rotation of the screw shaft 31, the wedge member 26 is moved axially either toward or away from the end of the other wedge thus increasing or decreasing the plunger width. The sides of the plunger defined by the wedge bases may be maintained parallel by reason of the clearance between the screw shaft 34 and the bore 32 in the wedge 25. With the diagonal surfaces 29 of the wedges making an angle of approximately 15° with their bases 27 in the illustrated embodiment (see Figs. 4 and 5), the expansion of the plunger across its width and thus between the side walls 21 of the plunger housing 19 is half the relative sliding movement of the wedges along their diagonal surfaces. A greater or lesser ratio depending on the desirability of the leverage thus attained may be selected in accordance with the angle of the wedges 25 and 26.

Figure 3:
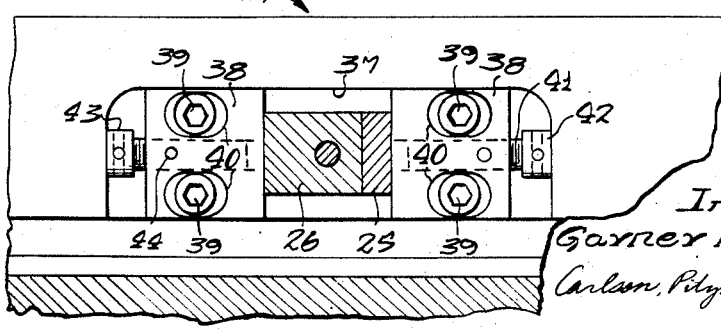
Fig. 3 is a radially directed view along lines 3—3 of the indexing mechanism of Fig. 2 showing a socket and a cross-sectional view of a plunger expanded therein.

Referring now to the socket assembly 17 previously mentioned and shown in Fig. 3, a substantially rectangular recess 37 in the table periphery or rim 8 is provided for each table position. In this case, four socket assemblies are desired, one below the center of each of the four straight sides of the table top.

The top and bottom surfaces of each recess 37 are machined to provide ample top and bottom clearances for the end of the plunger assembly 16. The precise angular position of the table 5 is, on the other hand, governed by the position of two guide blocks 38 which are horizontally slidable in each recess 37. Each of these blocks is mounted on a pair of vertically spaced screws 39 threaded into the inner surface of each recess 37 on each side of its vertical center line. A limited range of sliding motion is provided by forming the mounting bores in each block as horizontally elongated slots 40. Each screw 39 suitably has a socket head 41 so that it can be turned to hold each guide block 38 in the desired location along the range of positions permitted by the length of the elongated slots. The position of each of the blocks 38 is preferably adjusted by a stud or jack screw 42 in threaded engagement with a bore in each block and extending horizontally toward the nearest end wall of the housing or recess 37. An enlarged head end 43 on each jack screw provides a thrust surface, and by turning the heads of the jack screws, the spacing of each pair of blocks 38 is adjusted both relative to each other and to the end walls of socket recess 37. Set screws 44 are suitably employed to lock each jack screw 41 in the desired position after which the stud nuts 41 for locking the blocks firmly in position are tightened.

Figure 4:
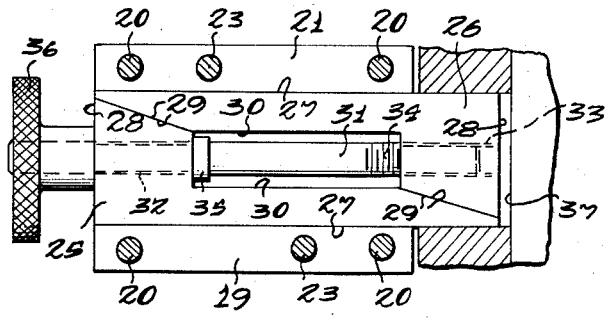
Fig. 4 is a sectional view of the indexing mechanism of Fig. 2 illustrating the mechanism in expanded position.
Figures 5, 6:
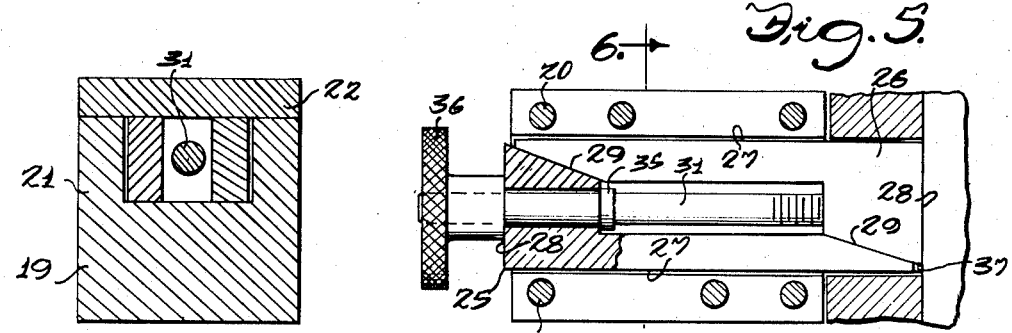
Fig. 5 is a top view partly in section, corresponding to Fig. 4 and showing the indexing mechanism in contracted position and ready to be withdrawn.
Fig. 6 is a sectional view along lines 6—6 of Fig. 5.

To make the initial setting of the indexing device, the table is first turned to the approximate desired position. It is to be understood that the table is turned by first opening the air valve 15 so that air under pressure is applied to the table surfaces above the lift pads 10. With the table in such a position that one of its plunger sockets 17 is approximately alined with the plunger 16, the plunger in its contracted width (as shown in Fig. 5) is slid into the socket defined between the facing surface of the blocks 38. After the plunger assembly is in place, its axial displacement being limited by one of the plunger stops 24, the knob 36 is adjusted to turn the screw shaft 31 and expand the plunger. This forces the wedge bases 27 against the respective side walls 21 of the plunger housing 19, leaving no clearance between them. Fig. 4 illustrates the plunger in its expanded position. All possibility of error or misalinement due to play between the plunger and the housing is thus eliminated.

With the table in its desired indexing position, the valve is turned to vent the air in the lift pads and the table is clamped firmly to the base 1. For this purpose, clamping bars 45 located below each corner of the table are screwed down on the lower flange 9 of the table extending from its rim 8. The bars are suitably mounted on upstanding studs 46 extending from the base 1 and are tightened by the adjusting nuts 47. Measuring the angular location with respect to any given starting point may be facilitated by a scale and index mark or vernier (not shown) on the base and table respectively. The socket blocks 38 are then tightened against the respective sides of the plunger assembly by turning the heads 43 of the jack screws 42, and the set screws 44 are turned to lock the block positions. To disengage the plunger assembly, the knob 36 of the plunger assembly is turned to collapse the plunger assembly so that the plunger can be easily withdrawn. The table may then be unclamped and the initial adjustment process repeated with respect to the other socket assemblies. In this way, the socket blocks 38 of each of the socket assemblies are readily adjusted so that the socket width is exactly adjusted to the expanded plunger width and the respective sockets are exactly spaced at 90° intervals around the table rim.

After the initial adjustment of the socket plugs, it will be appreciated that their setting does not need to be disturbed or revised when the table is subsequently employed for machining operations of the different sides of the workpiece mounted on the table. Each socket serves, in effect, as a second section of the plunger housing having the same width. Each time it is desired to move the table by one or more 90° spans, the air lift is actuated, and the table turned to the approximate position where the contracted plunger can be inserted in the socket. When the plunger is expanded the remaining indexing of the table required is provided by the expansion of the plunger itself. At each work position thus provided without recalibration, the table lift pressure is removed and the table clamped to the base again in order that the socket assembly need not bear the load imposed by the forces involved in the machining operation. It should be noted that the vertical end surfaces of the blocks 38 do not prevent any lowering of the table that may still be required after the plunger has been expanded. It is apparent, of course, that socket assemblies may be provided at other frequently employed angular settings of the table and that the exact position need not be determined when the socket assembly is originally installed since the socket is adjustable for both the angle and width as previously described. The angular adjustment is preferably limited to a few degrees as shown which is usually adequate and eliminates the need for reliance upon accuracy in originally machining the socket recesses.

Figure 7:
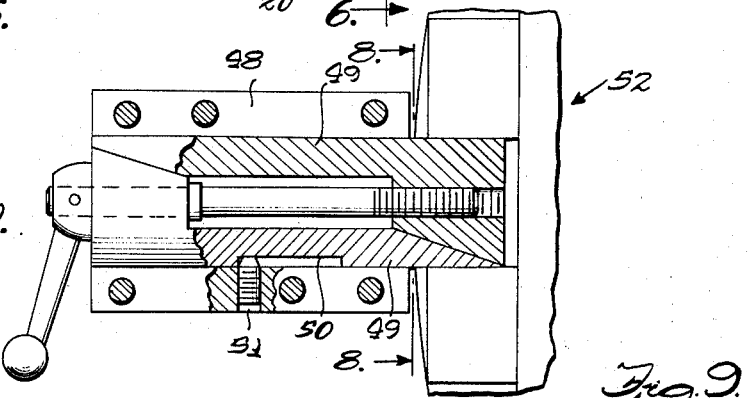
Fig. 7 is a top view partially in cross section of a modified indexing mechanism incorporating my invention.

Referring now to Figs. 7 and 8, a modification is shown therein which is especially useful for tables having no vertical displacement such as those having ball bearings instead of an air lift. The plunger housing 48 is a cylindrical bore to slidably house a cylindrical bar diagonally cut along its length into two complementary wedgelike members 49 which function as previously described. A groove 50 in one of the members is engaged by a pin 51 threadably engaging the housing 48 to limit the plunger travel.

In the adjustable socket 52 the stop blocks 53 are provided with substantially semi-circular opposed bearing surfaces to engage the circular plunger. When the plunger is expanded it departs somewhat from its circular shape by the amount of the radial displacement of the wedge portions, but the bearing surface of the blocks remains contiguous with substantial facing side portions of the plunger. Since this arrangement permits no vertical misalinement between the table and the base it has the advantage of being fully operative only when the facing surfaces of the table and base are correctly alined both horizontally and vertically as may be especially desirable or necessary in some installations.

I claim as my invention:

1. Positioning means for locking first and second members which are otherwise relatively movable along a given path in a selected relative position, which comprises a locking plunger slidably housed in said first member, means defining a recess in said second member for receiving one end of said plunger, means for adjustably expanding said plunger laterally to eliminate lateral clearance between said plunger and its housing in said first member, and means for selectively contracting the walls of said recess and locking them in position to eliminate lateral clearance between said one end of the plunger and said recess in said second member.

2. In combination, a work base, a work table mounted for rotation on said base, and indexing means for fixing said table in a precisely selected angular position relative to said base which includes a slidable plunger, said base having a housing with side walls defining a slide for said plunger, said plunger being directed radially toward the axis of rotation of said table, said table having a housing for receiving one end of said plunger when said table is substantially alined in the desired position, means for expanding the plunger laterally along its length to eliminate lateral clearance between one end portion of said plunger and the housing of said base, and means for selectively controlling the position of the lateral walls of the table housing to eliminate lateral clearance between said plunger and said table housing whereby the exactly predetermined angular table position is obtained.

3. An indexing table assembly for a machine tool comprising a base member attachable to the machine tool, a table rotatably mounted on said base, a plurality of socket recesses spaced around the periphery of the table, each of said recesses having positioned therein a pair of adjustable side blocks having facing surfaces, means for adjusting the relative position of each block with respect to the recess end surfaces to provide a given spacing between said facing block surfaces and a selected angular displacement relative to the other pairs of block surfaces, a plunger housing mounted on said base adjacent the table periphery, said housing having side walls separated by said given spacing, a plunger within said housing divided along a diagonal plane to permit sliding of the sections thereof relative to each other, means for sliding one end of said plunger in a contracted width less than said given spacing into a recess in said table when approximately alined therewith, and means for expanding the plunger to said given width by sliding the plunger sections relative to each other to fix the table in a precisely predetermined position relative to the base.

4. Means for precisely positioning a rotary machine tool table with respect to a base support which comprises a first plunger housing section mounted on said base having side walls with a given spacing between them, a plurality of socket recesses spaced about the periphery of said table defining alternative second sections of said housing, each of said socket recesses having positioned therein a pair of blocks adjustably spaced with respect to the end walls in each recess, means for locking the position of each pair of blocks with said given spacing between them to provide a predetermined angular spacing between the various pairs of blocks, a plunger of a width less than said given spacing freely slidable in said housing when the first housing section and one of the second housing sections are approximately alined, and means for laterally expanding said plunger to said predetermined width to index said table into exact alinement.

5. Indexing means for precisely positioning a rotary machine tool table with respect to a table base in a selected relative position, which comprises a locking plunger slidably housed on said base adjacent the table periphery, means for moving said plunger axially toward said table, means defining a recess in the table periphery for receiving one end of said plunger, means for adjustably expanding said plunger laterally to eliminate lateral clearance between said plunger and its housing on said base, and means for selectively contracting the walls of said recess and locking them in place to eliminate lateral clearance between the expanded plunger and said recess walls in said table.

6. An indexing means for precisely positioning a rotary machine tool table with respect to a station adjacent the table periphery comprising a slidable plunger, a housing for said plunger having side walls defining a plunger slide with first and second sections incorporated in said station and said table respectively for alinement at substantially the desired relative position of said first and second members, means for expanding said plunger laterally to eliminate clearance between the side walls of said first housing section and the corresponding plunger length, and adjustable means for selectively adjusting the positions of the side walls of the second housing section to eliminate lateral clearance between said housing section and the corresponding plunger section to thereby precisely aline the table and base.

7. An indexing means for precisely positioning a rotary machine tool table with respect to a station adjacent the table periphery comprising a plunger housing with first and second sections incorporated in said station and said table respectively for alinement at the desired relative position of the station and table, said first and second sections having side walls defining a plunger slide of a given width, a plunger in said first housing section divided along a diagonal plane to permit sliding of the plunger sections thereof relative to each other, means for sliding one end of said plunger in a contracted width less than said given width into said second housing section when approximately alined therewith, and means for sliding the plunger sections relative to each other to expand the plunger to said given width and aline precisely the angular position of the table.

References Cited in the file of this patent
UNITED STATES PATENTS

| | | |
|---|---|---|
| 2,521,030 | Wilson | Sept. 5, 1950 |
| 2,660,074 | Wilson | Nov. 24, 1953 |